Patented Sept. 11, 1951

2,567,828

UNITED STATES PATENT OFFICE 2,567,828

PROCESS OF MAKING DISAZO DYESTUFFS

Fritz Straub, Kaiseraugst, and Jakob Brassel and Peter Fieth, Basel, Switzerland, assignors to Ciba Limited, Basel, Switzerland, a Swiss firm No Drawing. Application December 29, 1947, Serial No. 794,458

4 Claims. (Cl. 260—182)

This application is a continuation-in-part of our copending applications, Serial No. 431,172, filed February 16, 1942 (now abandoned), and Serial No. 498,882, filed August 16, 1943 (now abandoned), the latter being a continuation-in-part of the former.

U. S. Patent No. 1,210,751 describes a process for the manufacture of a dyestuff, wherein tetrazotized 3:3'-dihydroxy-4:4'-diaminodiphenyl is brought together with two mols of 2-amino-5-hydroxynaphthalene-7-sulfonic acid in a medium which has been rendered alkaline with sodium carbonate. That patent also states that the reaction proceeds very slowly and that a dyestuff is formed which dyes cotton in violet tints. In carrying out this process, we have found that the resultant product does not at all meet modern requirements. The uncoppered as well as the coppered dyeings obtained therewith are quite insufficiently fast to washing. Further examination of the process of the aforementioned patent has shown that, contrary to what the inventors apparently believed, the result is not the expected disazo dyestuff and that for about 90 percent. coupling takes place on but one side so that a monoazo dyestuff is formed plus only about 10 per cent. of the disazo dyestuff.

We have now discovered that very valuable disazo dyestuffs which are substantially free from monoazo dyestuffs and which, when after-coppered, produce blue, wash-fast dyeings on cotton, can be prepared by coupling tetrazotized 3:3'-dihydroxy-4:4'-diamino-diphenyl with 2 mols of an amino-5-hydroxynaphthalene-7-sulfonic acid capable of coupling in the 6-position, the amino group of which is in a $\beta$-position, but not, of course, in the 6-position, and bringing about coupling in a medium rendered alkaline with a hydroxide of the alkaline earth metal series.

3:3'-dihydroxy-4:4'-diaminodiphenyl is a known compound and may be obtained, for instance, by saponifying 3:3'-dimethoxy-4:4'-diaminodiphenyl by means of aluminum chloride and may be purified, if necessary, according to known methods. It may be tetrazotized in known manner and the tetrazo compound may be used immediately after tetrazotizing or may be separated as described in the examples below.

Coupling components which may be used under our process are amino-5-hydroxynaphthalene-7-sulfonic acids which are capable of coupling in the 6-position and which carry the amino group in a $\beta$-position other than the 6-position, that is to say, in the 2- or 3-position. Such coupling components are, therefore, either 2-amino-5-hydroxynaphthalene-7-sulfonic acid or 3-amino-5-hydroxynaphthalene-7-sulfonic acid. The latter compound is usually called 2-amino-8-hydroxynaphthalene-6-sulfonic acid.

Alkaline earth metal hydroxides are here intended to mean—in conformity with the usual definition in text books—the hydroxides of calcium, strontium or barium, to the exclusion of magnesium hydroxide. Of these, calcium hydroxide is the most suitable for our process.

Coupling is advantageousy carried out at a high concentration. The amino-hydroxynaphthalene-sulfonic acid serving as coupling component may be used as a free acid or as an alkali salt, for example, the sodium salt. The coupling reaction requires quite some time. Its course can be accelerated by gradually increasing the temperature and/or by the addition of suitable reaction promoters, such as, for example, a small quantity of pyridine. If desired, the dyestuff which, for the greater part, separates during the coupling in the form of a salt of an alkaline earth metal may be separated from the suspension by means of filtration before it is freed from the alkaline earth metal. Such freeing is usually necessary to make the product better suitable for dyeing. It is effected, for example, by treatment with an alkali carbonate, advantageously at a raised temperature, which causes the dyestuff to dissolve as an alkali salt. The solution is separated from the alkaline earth metal carbonate by means of filtration, and the dyestuff is finally separated by the addition of sodium chloride and/or mineral acid, for example, hydrochloric acid.

The disazo-dyestuffs obtainable according to the present process correspond in their free acid state to the general formula

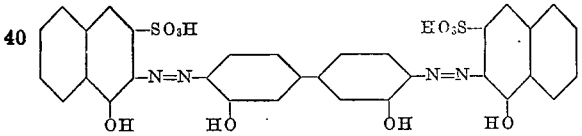

wherein each of the napthalene radicals carries one $NH_2$-group in a $\beta$-position. They are substantially free from admixed monoazo-dyestuff and produce blue after-coppered shades on cotton.

They are suitable for dyeing and printing the most diverse materials, especially cellulose fibers, such as linen, cotton, and other vegetable fibers as well as cellulose, rayons and staple fibers. Owing to their derivation from an ortho-hydroxydiazo compound, these dyestuffs are capable of forming metal compounds, for instance, with the metals copper, cobalt, nickel, iron, chromium, vanadium, manganese. With these dyestuffs it is advantageous to effect metallization during or, still better, after dyeing according to the known after-treating, for instance after-coppering, methods. With special advantage use may be made of the dyeing methods described in U. S. Patents 2,148,659 and 2,185,905, according to which metallizing is preferably carried out with agents yielding metal which are stable towards alkalis, for instance, complex tartrates of copper.

The following examples illustrate the invention, the parts being by weight unless otherwise stated:

Example 1

21.6 parts of 3:3'-dihydroxy-4:4'-diaminodiphenyl, in the form of its dichlorhydrate, are stirred in 100 parts of water and 12 parts of concentrated hydrochloric acid and are tetrazotized by addition of an aqueous solution of 13.8 parts of sodium nitrite at 5–8° C. When tetrazotization is complete, the suspension is cooled to 3° C., neutralized by addition of 6.4 parts of sodium carbonate and filtered to obtain the precipitated tetrazo compound.

This tetrazo compound is introduced into a paste of 48.8 parts of 2-amino-5-hydroxynaphthalene-7-sulfonic acid and 29.6 parts of calcium hydroxide in 200 parts of water cooled to 5° C. Coupling is carried out for 2 hours at 5–8° C. at first, then the reaction is completed by stirring for several hours at 10–20° C. The coupling mixture is then diluted with 2000 parts of water at 50° C., 60 parts of sodium carbonate are added and the precipitated calcium carbonate is filtered off. 140 parts of 10 percent hydrochloric acid are added to the filtrate and the new dyestuff is obtained by salting out.

When dry, it is a bronzy black powder of the formula

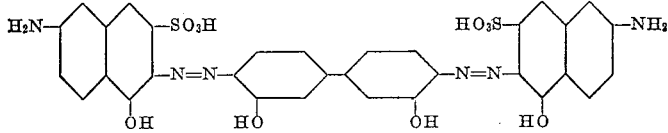

and dissolves in water to a blue-violet, in 10 percent soda solution to a reddish blue, in 10 percent caustic soda to a red violet, and in concentrated sulfuric acid to a green-blue solution. When dyed on cotton and after-treated with copper salts in a one or two bath process, it yields fast blue shades.

Example 2

21.6 parts of 3:3'-dihydroxy-4:4'-diaminodiphenyl are tetrazotized as described in Example 1. The precipitated tetrazo compound is filtered off and introduced into a paste of 58 parts of the mono-sodium salt of 2-amino-5-hydroxynaphthalene-7-sulfonic acid and 34 parts of calcium hydroxide in 200 parts of water cooled to 2° C. Coupling is carried on for 4 hours at 2–10° C. and then for 20 hours at 10–20° C. The coupling mixture is then diluted with 400 parts of a sodium chloride solution of 70° C. and 7 per cent. strength and the calcium salt of the dyestuff is filtered off. The filter cake is suspended in 2000 parts of water, the suspension is heated to 60° C., 400 parts by weight of sodium carbonate of 20 per cent. strength are then added and the precipitated calcium carbonate is filtered off. To the filtrate there are first added 120 parts of sodium chloride and then the quantity of 10 percent. hydrochloric acid which is necessary to obtain a reaction weakly alkaline to phenolphthalein. Finally, the precipitated dyestuff is filtered off and dried. It has the same properties as the dyestuff obtained in accordance with the prescriptions of Example 1.

Example 3

21.6 parts of 3:3'-dihydroxy-4:4'-diaminodiphenyl are tetrazotized as described in Example 1, the solution is neutralized with sodium carbonate solution and the precipitated tetrazo compound is filtered off.

49.2 parts of 2-amino-8-hydroxy-naphthalene-6-sulfonic acid are stirred into 250 parts of water and 29.6 parts of slaked lime are added. The suspension is cooled to 5° C., and the filtered tetrazo compound is added. The coupling temperature is maintained for 2 hours at 5–8° C., then for 48 hours at 10–15° C. and, finally, at 20–25° C. until the reaction is complete. The coupling mass is then diluted with 1000 parts of water at 50° C. a solution of 60 parts of sodium carbonate in 300 parts of water is added and the precipitated calcium carbonate is filtered off. To the filtrate, 60 parts of sodium chloride and then, in drops, 110 parts of 10 per cent. hydrochloric acid are added. The new dyestuff is filtered off and dried.

It possesses the formula

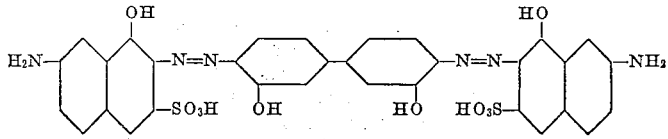

and is a bronzy black powder which dissolves in water with a blackish blue-violet, in 10 per cent. soda solution with a blue, in 10 per cent. caustic soda with a red-violet and in concentrated sulfuric acid with a green-blue color. When dyed on cotton and after-treated with copper salts, in either a one or a two bath process, it yields blue shades of very good fastness properties.

Example 4

A dyebath is made up from 4000 parts of water, 2 parts of anhydrous sodium carbonate and 2 parts of the dyestuff obtained according to Example 1. 100 parts of cotton are entered at 60° C. The bath is heated to the boil within 20 minutes. 30 parts of crystallized sodium sulfate are added and dyeing is continued for 45 minutes at about 100° C. The bath is then cooled to 75–80° C., 1.5 parts of complex copper sodium tartrate, containing 0.23 part of copper and previously dissolved in water, are added and the dyeing is coppered for 40 minutes at 80–90° C. Finally, the coppered dyeing is rinsed with cold water, if desired, soaped at 50° C. in a bath containing 5 grams of curd soap and 2 grams of anhydrous sodium carbonate per liter of water, and dried. The cotton is dyed in a fast pure blue shade.

What we claim is:

1. Process for the manufacture of a disazo dyestuff which comprises coupling tetrazotized 3:3'-dihydroxy-4:4'-diaminodiphenyl with two molecular proportions of an amino-5-hydroxynaphthalene-7-sulfonic acid capable of coupling in 6-position and wherein the amino group is a primary amino group in a β-position, in a medium rendered alkaline with an alkaline earth metal hydroxide.

2. Process for the manufacture of a disazo dyestuff which comprises coupling tetrazotized 3:3'-dihydroxy-4:4'-diaminodiphenyl with two molecular proportions of an amino-5-hydroxynaphthalene-7-sulfonic acid capable of coupling in 6-position and wherein the amino group is a primary amino group in a β-position, in a medium rendered alkaline with calcium hydroxide.

3. Process for the manufacture of a disazo dyestuff which comprises coupling tetrazotized 3:3'-dihydroxy-4:4'-diaminodiphenyl with two molecular proportions of 2-amino-5-hydroxynaphthalene-7-sulfonic acid in a medium rendered alkaline with calcium hydroxide.

4. Process for the manufacture of a disazo dyestuff which comprises coupling tetrazotized 3:3'-dihydroxy-4:4'-diaminodiphenyl with two molecular proportions of 2-amino-8-hydroxynaphthalene-6-sulfonic acid in a medium rendered alkaline with calcium hydroxide.

FRITZ STRAUB.
JAKOB BRASSEL.
PETER PIETH.

REFERENCES CITED

The following references are of record in the file of this patent:

UNITED STATES PATENTS

| Number | Name | Date |
|---|---|---|
| 521,096 | Bernthsen et al | June 5, 1894 |
| 964,918 | Laska | July 19, 1910 |
| 1,210,751 | Anderwert et al. | Jan. 2, 1917 |
| 1,921,361 | Laska et al. | Aug. 8, 1933 |
| 2,042,810 | Straub et al. | June 2, 1936 |
| 2,257,165 | Fellmer | Sept. 30, 1941 |
| 2,428,130 | Straub et al. | Sept. 30, 1947 |
| 2,437,699 | Lancius et al. | Mar. 16, 1948 |

FOREIGN PATENTS

| Number | Country | Date |
|---|---|---|
| 102,881 | Great Britain | June 4, 1917 |
| 113,141 | Great Britain | Feb. 8, 1918 |